United States Patent [19]
Aldred

[11] 3,854,271
[45] Dec. 17, 1974

[54] DRIVE MECHANISMS

[75] Inventor: Edward J. Aldred, Ipswich, England

[73] Assignee: Ransomes, Sims & Jefferies, Limited, Ipswich, England

[22] Filed: Mar. 27, 1973

[21] Appl. No.: 344,181

[30] Foreign Application Priority Data
Mar. 27, 1972 Great Britain..................... 14343/72

[52] U.S. Cl............................ 56/7, 56/10.9, 56/11.3
[51] Int. Cl............................................ A01d 75/30
[58] Field of Search ......... 56/10.9, 11.3, 11.4, 11.9, 56/7; 60/430, 431, 97

[56] References Cited
UNITED STATES PATENTS
2,953,164  9/1960  Haberland et al. .............. 56/10.9 X
3,429,110  2/1969  Strasel .................................... 56/7
3,511,033  5/1970  Strasel .................................... 56/7

Primary Examiner—Louis G. Mancene
Assistant Examiner—J. N. Eskovitz

[57] ABSTRACT

A drive mechanism for driving a plurality of independently rotatable members, comprising a plurality of fluid motors each adapted to be connected to a respective one of the rotatable members, a plurality of variable delivery pumps each connected to a respective one of the fluid motors or to a respective group of the motors to supply fluid thereto, a prime mover arranged to drive the pumps, and control means operable to vary simultaneously the rates of delivery of fluid from each of the pumps thereby to vary the speed of rotation of the respective motors or groups of motors while maintaining constant at a pre-set value the ratio of the rates of delivery of respective pumps. The mechanism can be used in a lawn mower, having traction motors supplied from one pump and motors driving the cutting cylinders supplied from a second pump, the rates of delivery of the pumps being kept in constant proportion to give a constant number of cuts per yard for the lawn mower.

15 Claims, 8 Drawing Figures

DRIVE MECHANISMS

This invention relates to drive mechanisms for supplying driving power to a plurality of independently rotatable members.

It is often necessary to be able to vary the speeds of rotation of a plurality of rotatable members while maintaining constant the ratio of the speed of rotation of each member to that of the other members. For example, in a motor driven mowing machine of the kind having one or more cutting cylinders comprising a number of helically extending blades, it is desirable to drive the or each cutting cylinder at a speed which is in a constant ratio to the forward speed of the machine, so that the number of cuts per yard made by the mower is constant and a uniform finish is obtained on the cut grass surface.

It is advantageous in such a mowing machine to drive the cutting cylinders by means of hydraulic motors supplied with fluid by a positive displacement pump driven by the engine of the mowing machine, for example as described in United Kingdom Pat. specification No. 1,093,251. It is also advantageous to drive the mowing machine by means of hydraulic motors driving the traction wheels of the machine and supplied with fluid from a variable delivery pump driven at constant speed by the engine. However, the problem then arises of driving the cutting cylinders at a speed which is in constant ratio to the speed of the traction wheels for all forward speeds of the machine. One way of doing this would be to supply the cutting cylinder motors from fixed displacement pumps connected to the output shafts of the traction wheel motors. This, however, would have the disadvantage of increasing the energy losses due to the relative inefficiency of hydraulic pumps and motors.

According to this invention there is provided a drive mechanism for driving a plurality of independently rotatable members, comprising a plurality of fluid motors each adapted to be coupled to a respective one of the rotatable members, a corresponding number of variable delivery pumps each connected to a respective one of the fluid motors or to a respective group of the motors to supply fluid thereto, a prime mover arranged to drive the pumps, and control means operable to vary simultaneously the rates of delivery of fluid from each of the pumps thereby to vary the speed of rotation of the respective motors or groups of motors while maintaining constant at a preset value the ratio of the rates of delivery of respective pumps.

Preferably, the control means is adjustable to vary the preset value of the ratio of the rates of delivery of any selected pair of the pumps.

In one form of the invention there is provided a motor driven lawn mower having a ground-engaging traction member and a rotatable cutting cylinder, and a drive mechanism for the traction member and cutting cylinder comprising a prime mover, a first fluid motor drivingly connected to the traction member, a second fluid motor drivingly connected to the cutting cylinder, first and second variable delivery pumps each adapted to be driven by the prime mover and arranged to supply hydraulic fluid to the first and second motors respectively, and control means operable to vary simultaneously the delivery of each pump while maintaining constant the ratio of the rates of fluid supply to the first and second motors, thereby to keep constant the ratio of speeds of rotation of the cutting cylinder and traction member.

Advantageously, valve means are provided which are operable to divert the flow of fluid supplied by the second variable delivery pump from the second motor or motors to the first motor, to give an increased traction speed for transport of the machine between cutting operations.

The invention will now be described, by way of example, with reference to the accompanying drawings, in which.

Figure 1:
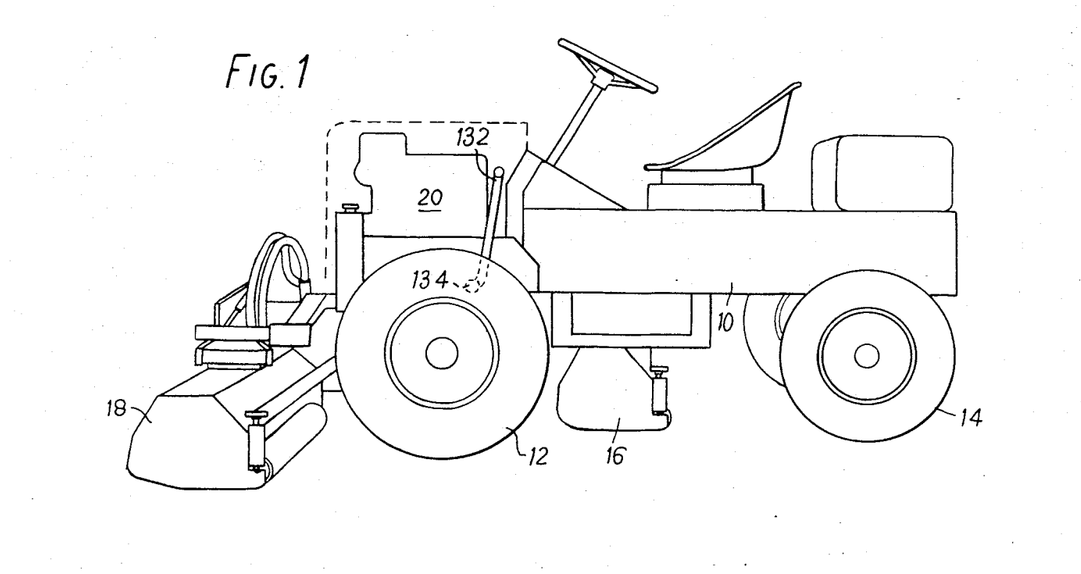
FIG. 1 is a diagrammatic side elevation of a gang mowing machine incorporating the drive mechanism of the present invention.
Figure 2:
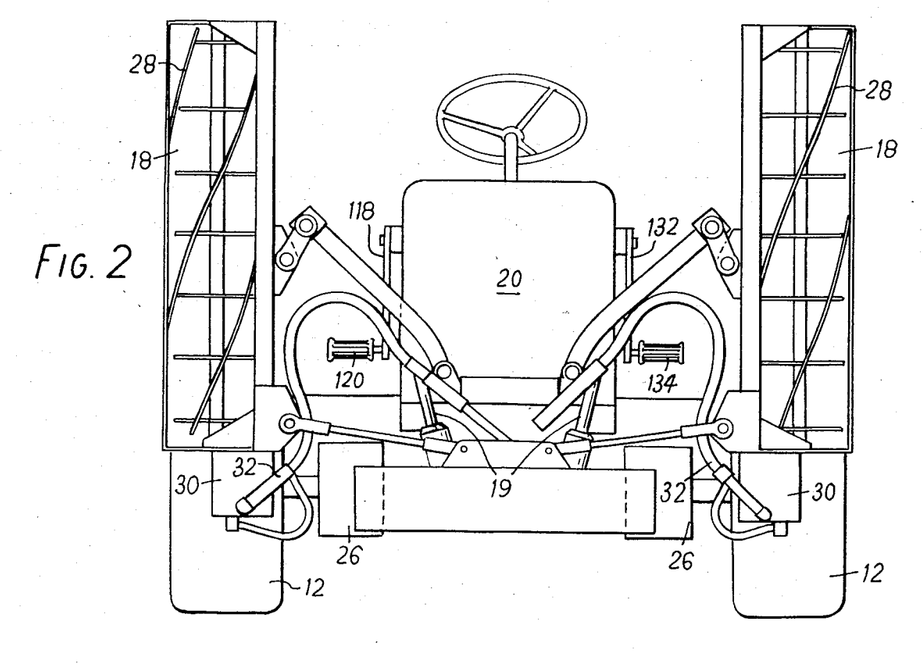
FIG. 2 is a diagrammatic front elevation of the mowing machine of FIG. 1.

Referring to FIGS. 1 and 2, a drive mechanism is provided for a gang mower machine having a chassis 10 supported on a pair of traction wheels 12 and a pair of steerable wheels 14, a center cutting unit 16 mounted on the chassis 10 between the two pairs of wheels 14 and 16, and two wing cutter units 18 mounted on the front of the chassis 10 so that they can be swung from an operative position in which they project outwards beyond the sides of the chassis, as shown in FIG. 1, to a transport position in which they are arranged vertically close to the chassis to reduce the overall width of the machine, as shown in FIG. 2. The mounting structure of the three cutter units may be similar to that of the gang mower described in United Kingdom Pat. specification No. 989,914 or in United Kingdom Pat. specification No. 1,093,251. The wing units 18 are moved to their transport position by means of hydraulic rams 19 (FIG. 2). The center unit 16 can similarly be lifted from its operative position to a transport position by means of a hydraulic ram (not shown).

The mower has a drive mechanism including, mounted on the chassis 10, an internal combustion engine 20 which drives, through suitable gearing (not shown) in gearbox 21, a pair of variable delivery, positive displacement hydraulic pumps 22 and 24 (see FIG. 3) mounted side by side on the gearbox 21, which is attached to the engine 20 and also forms the rear mounting for the engine 20 on chassis 10. Each traction wheel 12 is driven by a positive displacement hydraulic motor 26 connected to a hydraulic circuit (see FIG. 8) associated with pump 22. The cutting cylinder 28 of each cutting unit 16 and 18 is driven by a positive displacement hydraulic motor 30 mounted on the cutting unit and connected to the hydraulic circuit of the other pump 24 through flexible conduits 32 which allow movement of the cutting units between their transport and operative positions.

Figure 8:
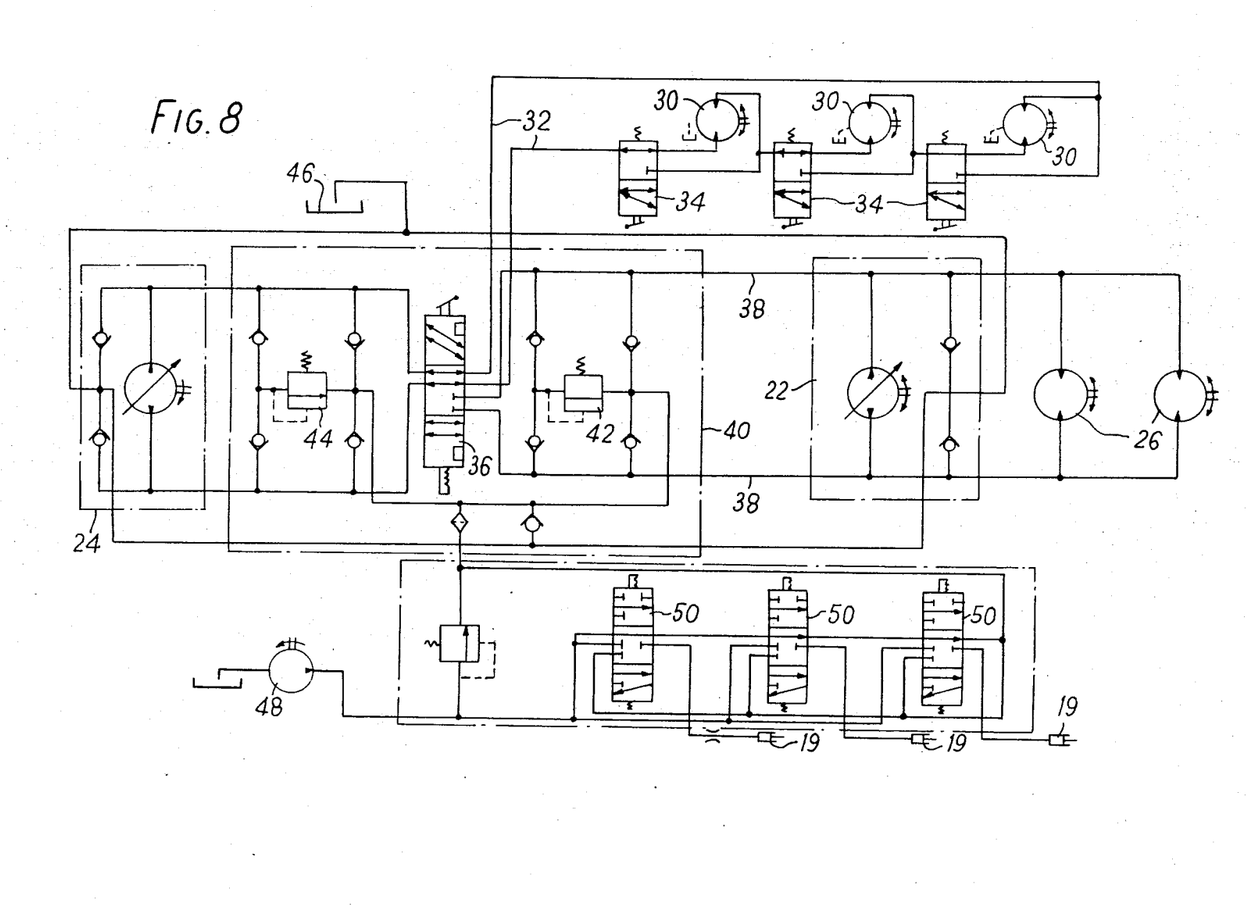
FIG. 8 is a diagram of the hydraulic circuits of the machine of the preceding Figures.

Referring to the hydraulic circuit diagram shown in FIG. 8, the traction wheel motors 26 are connected in parallel to the pump 22, so that the wheels can rotate at different speeds to give a differential action when the machine travels around a curve. The cutting cylinder motors 30 are connected in series, through conduits 32, to the pump 24, so that the cutting cylinders are all rotated at the same speed, determined by the rate of delivery of fluid from pump 24. Each motor 30 is supplied through a two-position valve 34, which can be set so that fluid by-passes the motor, while the two sides of the motor are connected together to place the motor in a free-wheeling condition, to enable any one or any pair of the cutting units to be driven separately. The pump 24 is connected to the motors 30 through a valve 36. With the valve 36 in the position shown, the hydraulic circuit of the pump 22 and traction motors 26 is separate from that of pump 24 and the cylinder motors 30. The valve 36 can also be set, by means of a handle operated by the driver of the machine, to a position in which the conduits 32 are connected together so that all the cylinder motors are in a freewheel condition, while the output of pump 24 is directed through lines 38 to the traction motors 26, to give a high speed drive during transport of the mower, as described below. A third position of valve 36 connects lines 38 together, to place the traction motors 26 in a freewheel condition, while fluid from pump 24 is supplied to the cylinder motors 30, to enable the cylinders to be rotated while the machine is stationary, for example when driving the cylinders in reverse to sharpen the blades by back-lapping. The valve 36 is contained in a valve block 40 together with relief valves 42 and 44 for the pumps 22 and 24. The part of the circuit just described therefore forms a closed circuit, make up oil to replenish leakages being provided by a boost pump 48 and introduced into the closed circuit through check valves in the valve block 40.

The hydraulic circuit diagram also shows the cutting unit lifting rams 19, which are supplied with fluid from a boost pump 48, through control valves 50.

Figure 3:
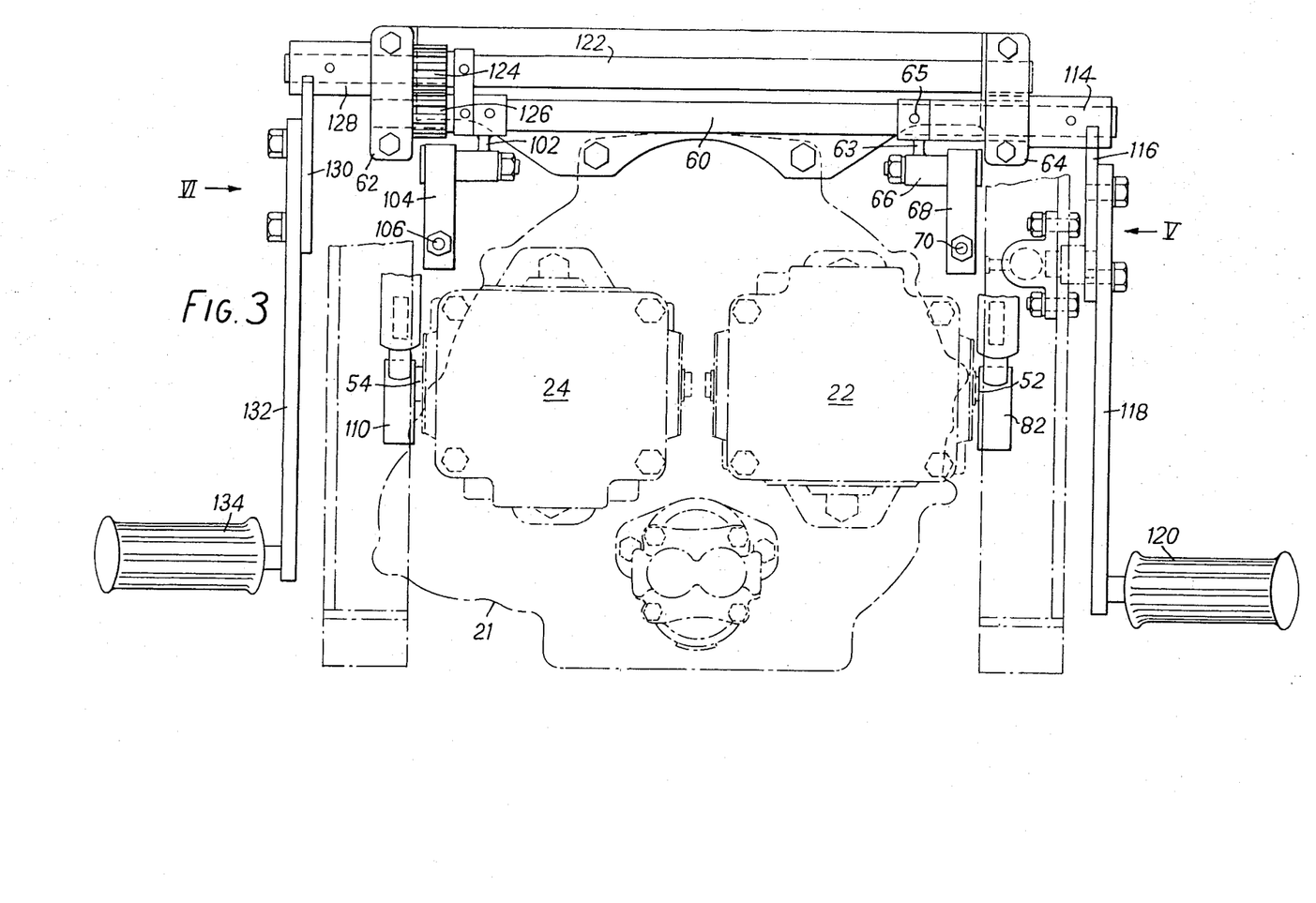
FIG. 3 shows part of the speed control mechanism of the machine of FIGS. 1 and 2.

Each of the pumps 22 and 24 is a variable-delivery, axial-flow swashplate pump, whose rate of delivery is adjustable by means of a rotatable control shaft (52 on pump 22 and 54 on pump 24, see FIG. 3). The rate of delivery of each pump is proportional to the angular displacement of the control shaft from a neutral position in which the rate of delivery is zero, displacement of the control shaft in one sense causing delivery of fluid in one direction and displacement of the shaft in the opposite sense causing reversal of the fluid flow.

Figure 5:
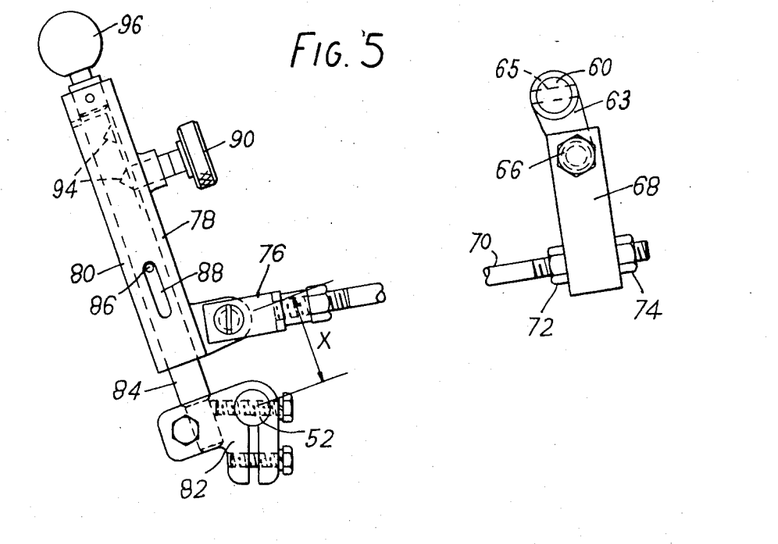
Figure 6:
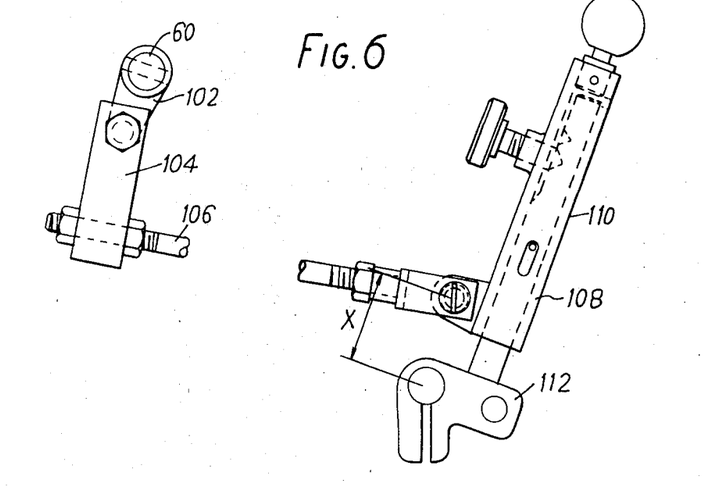

The speed control mechanism of the mowing machine will now be described, with particular reference to FIGS. 3, 5 and 6.

A main control shaft 60 is rotatably mounted above pumps 22 and 24, in bearing blocks 62 and 64 fixed to chassis 10, the axis of shaft 60 being horizontal and lying perpendicular to the fore-and-aft axis of the mowing machine. Fixed to shaft 60, by means of a pin 65, is a lever 63, to the free end of which is pivotally connected, by means of a bush 66, a bar 68. A tie rod 70 is rigidly fixed to bar 68, a threaded part of the rod 70 extending through a bore in bar 68 and held by nuts 72 and 74. The rod 70 extends rearwardly from bar 68 to a clevis 76 pivotally connected to a sleeve 78 forming part of a selector assembly 80 which is fixed by means of a clamp block 82 to the control shaft 52 of pump 22. The bar 68 and tie rod 70 thus form a link between lever 63 and the lever provided by selector assembly 80, so that rotation of the main control shaft 60 effects rotation of the control shaft 52 of pump 22.

The selector assembly 80 comprises a rod 84, rigidly fixed to clamp block 82, and sleeve 78 slidable on rod 84 between two positions defined by the engagement of a pin 86 fixed to rod 84 with the two ends of a slot 88 in sleeve 78. The sleeve can be locked in either position by means of a hand-operated locking wheel 90 having a shank 92 threadedly engaging a bore in sleeve 78 and able to engage in one or the other of the two recesses 94 in rod 78. A knob 96 is fixed to the free end of sleeve 78 to facilitate movement of the sleeve. It will be apparent that the two positions of the sleeve 78 give two different values for the effective length "X" (see FIG. 5) of the pivot arm provided by the selector assembly. Thus the rotation of the pump control shaft 52 produced by a given angular movement of the main control shaft 60 is different for the two different positions of sleeve 78.

The control shaft 54 of the pump 24 supplying the cylinder motors is similarly connected to the main control shaft 60 through a linkage consisting of a lever 102 fixed to shaft 60, and a bar 104 and tie rod 106 connecting the lever 102 to the sleeve 108 of a selector assembly 110 fixed by a clamp block 112 to control shaft 54. As shown in FIG. 6, the sleeve 108 is movable between two positions to vary the pivot arm length "X". One of these positions (the position shown in FIG. 6) gives a length "X" equal to the length "X" of selector assembly 80 when the sleeve 78 of the latter assembly is set to the position shown in FIG. 5. The other position of sleeve 108 gives a value of "X" less than that given by the second position of the sleeve 78, so that, by moving one or both of the sleeves 78 and 108 to the second position, three settings can be obtained in which the values of "X" differ for the two selector assemblies 80 and 110.

It will be appreciated that rotation through a given angle of the main control shaft 60 causes an angular displacement of each of the pump control shafts 52 and 54 proportional to the length "X" to which the corresponding selector assembly 80 or 110 is set. If the two lengths "X" are equal, then rotation of shaft 60 produces equal angular displacements of shafts 52 and 54. If the lengths "X" are different, rotation of shaft 60 produces angular displacements of shafts 52 and 54 which are in the same proportion to each other as the ratio of the two lengths "X". Thus the rate of delivery of fluid from pumps 22 and 24 can be varied by rotating control shaft 60, the rates of delivery of the two pumps remaining in constant proportion to one another, so that the speeds of rotation of the traction wheel motors 26 and cylinder motors 30 can be simultaneously varied while the ratio of the speed of motors 26 to that of motors 30 remains constant.

Fixed to the right-hand end of the main control shaft 60 is a sleeve 114, to which is welded a quadrant plate 116. Bolted to quadrant plate 116 is a pedal lever 118, the lower end of which carries a pedal 120. The pedal is positioned so that it can be pushed forward by the right foot of the driver of the machine. A second control shaft 122 is rotatably carried, in the bearing blocks 62 and 64, above and parallel to the main control shaft 60. The shafts 60 and 122 are connected by intermeshing pinions 124 and 126 so that rotation of one shaft in one sense will produce a rotation in the opposite sense of the other shaft. Fixed to the left-hand end of shaft 122 is a sleeve 128 to which is welded a plate 130. Bolted to plate 130 is a lever 132 carrying at its lower end a pedal 134, positioned so that it can be operated by the left foot of the driver of the machine.

The control mechanism is arranged so that when the two pedals 120 and 134 are in a neutral position, with the two pedals at similar longitudinal positions on the two sides of the chassis 10, then the control shafts 52 and 54 of pumps 22 and 24 are in their neutral positions so that the fluid flow from each pump is zero. A fine adjustment of the settings of the control shafts 52 and 54 can be effected by adjusting the lengths of the links between the levers 63 and 102 and the respective selector assemblies 80 and 108 (e.g., by adjusting nuts 72 and 74 in the case of assembly 80). If the pedal 120 is pushed forwards by the right foot of the driver, the control shaft 52 of pump 22 is rotated to cause delivery of fluid to the traction wheel motors 26 (assuming valve 36 is appropriately set) to cause forward movement of the machine. At the same time, pedal 134 is moved backwards by rotation of shaft 122. If pedal 134 is then pushed forwards by the left foot of the driver, shaft 122 is rotated and causes rotation in the opposite sense of the main control shaft 60, so that the control shafts of the pumps are rotated in the opposite direction, and at the same time pedal 120 is moved backwards. If pedal 134 is pushed forwards beyond the neutral position, the flow of fluid from the pumps 22 and 24 will be reversed so that for example, if valve 36 is appropriately set, the direction of travel of the machine will be reversed.

Figure 4:
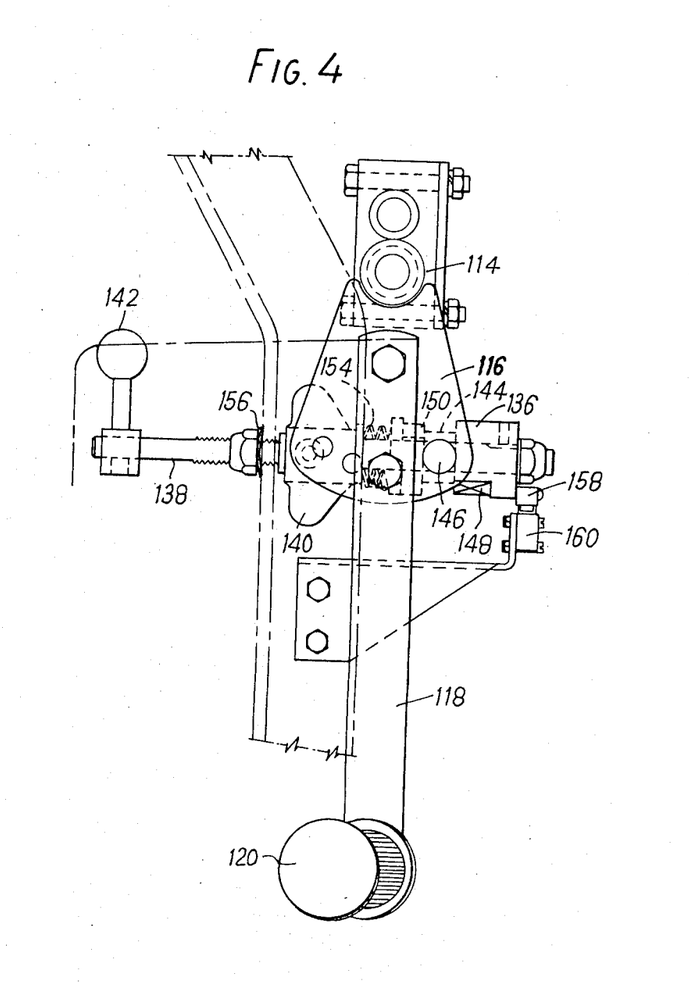
FIG. 4 is a side elevation of the mechanism of FIG. 3, FIGS. 5 and 6 show in further detail parts of the mechanism of FIGS. 3 and 4.
Figure 7:
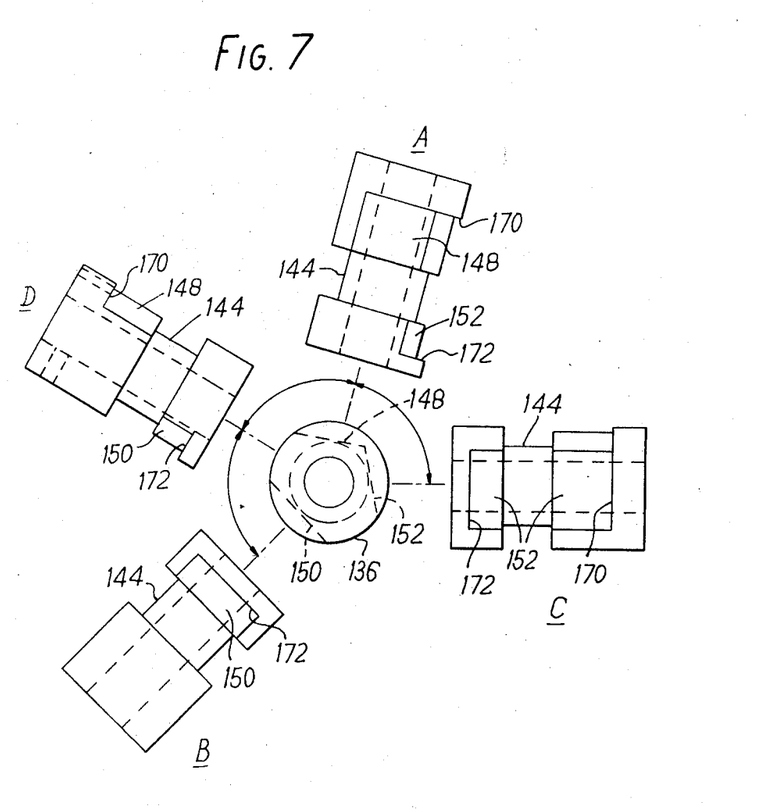
FIG. 7 is a composite diagram showing an end elevation and side elevations in four different orientations of part of a selector mechanism of the machine of the preceding Figures.

FIG. 4 shows a selector assembly which allows the driver to set limits on the movements of pedals 120 and 134 during various operations of the machine. The selector assembly comprises a sleeve 136 fixed to a horizontal shaft 138 rotatably carried in a bearing 140 fixed to the frame of the machine, the shaft 138 extending parallel to the fore-and-aft axis of the machine between pedal lever 118 and the body of pump 22. The shaft 138 can be rotated by means of a handle 142. The sleeve 136 lies adjacent the quadrant plate 116 and is formed with an annular groove 144 which can receive a pin 146 fixed to plate 116. The arrangement is such that when pin 146 is engaged in groove 116 the pedal lever 118 is in its neutral position. The sleeve is formed with three flats 148, 150 and 152 arranged at three different orientations (see FIGS. 4 and 7) so that they can be brought in turn to face the quadrant plate 116, in which position the pin 146 can move freely across the adjacent flat. Flat 148 is on the forward side of groove 144, so that with the shaft 138 orientated as illustrated at A in FIG. 7, the pedal lever 118 can move forwards from its neutral position but is prevented from moving rearwards from its neutral position by engagement of pin 146 with the side of groove 144. Flat 150 extends rearwardly from groove 144, so that with shaft 138 orientated as shown at B in FIG. 7, the pedal lever 118 can move rearwardly from its neutral position. Flat 152 extends on both sides of groove 144, so that with shaft 138 in orientation C (FIG. 7) the pedal lever 118 can move freely over its full range of movement. When the shaft 138 is orientated as shown at D in FIG. 7, pedal lever 118 is held in its neutral position. The shaft 138 has a small degree of freedom of longitudinal movement to allow the driver, when the selector holds the pedals in their neutral position, to move the pedals slightly to correct any creep of the traction motors. The shaft 138 is held in a central position by disc springs 154 and 156 positioned between abutment faces on the shaft and parts of the frame of the machine. A cam 158 fixed to the forward end of the shaft engages and closes a microswitch 160 when the shaft is orientated to hold the pedals in their neutral position. Switch 160 is so connected in the electrical circuit of the machine that the engine starter motor can only be operated when the switch is closed i.e., when the pedals are in the neutral position. It will be apparent that selector shaft 138 can only be rotated when the pedals are in the neutral position.

When the selector assembly is set so that the pedal lever 118 can only move forwards from its neutral position, the driver of the machine has control through the pedals of the forward speed of the machine over its full range of speed, but cannot push the left-hand pedal 134 forwards beyond its neutral position to reverse the direction of travel of the machine. There is therefore no danger of throwing the machine accidentally in reverse, which is especially useful when the machine is being driven, in its transport condition, in traffic on public roads. Similarly, the selector assembly can be set to enable only reverse travel of the machine, or can be set to allow both forward and reverse travel to be obtained under the control of the pedals alone. An end stop 170 formed at the forward ends of flats 148 and 152 acts to limit the forward movement of pedal 120 and thus prevents pressure exerted on the pedal during maximum speed forward travel from being transmitted to the pump control shafts 52 and 54. Similarly an end stop 172 formed at the rear ends of flats 150 and 152 limits backwards movement of pedal 120 to set a limit to the maximum reverse speed of the machine.

In operation of the mowing machine, the selector assemblies 80 and 110 in the control mechanism for pumps 22 and 24 are pre-set to give the desired ratio of rotational speed of the cutting cylinders 28 to the speed of the traction wheels 12 and hence to give the desired number of cuts per yard of the mower to suit the finish required for the area of grass to be cut. The various valves in the hydraulic circuit are set so that the two pumps 22 and 24 supply fluid respectively to the traction wheel motors 26 and to the cutting cylinder motors 30. The operator of the mower pushes the right hand pedal 120 forwards to rotate the main control shaft 60 and cause the pumps 22 and 24 to supply fluid to the traction wheel motors 26 to drive the mower in the forward direction and to the cutting cylinder motors 30 to effect forward rotation of the cutting cylinders 28. The operator can, through the pedals 120 and 134, vary the forward speed of the mower from zero to its maximum value, the ratio of the speeds of the cutting cylinders and traction wheels remaining substantially constant so that the number of cuts per yard made by the mower remains substantially constant. The setting of this ratio is not disturbed by reversing the machine or by operating independently the traction wheel motors 26 or any of the cutting cylinder motors 30. When the mower is to be transported between areas of grass to be cut, particularly when it is to be transported on roads where a speed higher than the normal operating speed of the mower is desirable, the cutting units are raised to their transport positions by operation of rams 19, and valve 36 in the hydraulic circuit is actuated to divert the output of the pump 24 to the traction wheel motors 30. Thus the traction motors 30 receive fluid from both pumps 22 and 24 operating in parallel and so can be driven at a relatively high speed, while the cutting cylinder motors 26 are prevented from operating during transport, so avoiding excessive load on the engine 20, which, for weight considerations and economy, is desirably small. To obtain maximum forward speed, the selector assemblies 80 and 108 must be set to the positions shown in FIGS. 5 and 6.

It will be appreciated that the ratio of speeds of the cutting cylinders 28 and traction wheels 12 can be readily adjusted by altering the settings of selector assemblies 80 and 110 as desired to suit different conditions of operation.

With the drive mechanism described, both the traction wheels and cutting cylinders are driven through variable delivery pumps which are small and operate at relatively high pressures and high rates of flow of fluid, which makes for efficient operation. The use of separate pumps for traction wheel motors and cylinder motors enables each pump to operate at the pressure required by its associated circuit, which is often different for each circuit.

The control of the pumps by means of two pedals, the pedal operated by the driver's right foot being pushed forwards to increase the forward speed or decrease the reverse speed of the machine, and the pedal operated by the driver's left foot being pushed forwards to decrease the forward speed or increase the reverse speed of the machine, allows the driver to control quickly and easily the driving power supplied to the traction motors and cylinder and so gives great maneuvrability to the machine.

It will be appreciated that many modifications could be made in the described embodiment.

The speed control mechanism of the described embodiment could be modified to suit different forms of variable delivery pump. For example, use could be made of pumps of the kind in which the rate of delivery is variable by means of a plunger movable in a straight line relative to the pump casing. In that case, the control means could comprise a rotatable control shaft, a plurality of lever arms fixed to the shaft, each corresponding to one of the pumps and each pivotally connected to the plunger of the corresponding pump so that rotation of the control shaft through a small angle effects movement of each plunger through a distance dependent on the angle of rotation of the shaft and the radial distance from the axis of the shaft to the point of pivotal connection of the lever arm to the plunger. Suitably, the position of connection of the plunger to the lever arm is adjustable for one or more of the pumps.

The drive mechanism of the invention could be applied to a gang mowing machine having more than three cutting units, for example to a machine having seven or nine cutting units. In that case it would be impractible to use a single pump to supply all the fluid motors driving the cutting cylinders, and a plurality of pumps would need to be provided. In the case of a machine having nine cutting units, for example, three pumps might be provided, each supplying three of the cutting cylinder motors connected in series. Each of the three pumps would be connected to the control mechanism so that their rates of delivery remain equal to one another and in a constant ratio to the rate of delivery of the pump associated with the traction wheel motors as the speed of the mower is varied. The drive mechanism of this invention could be used in other applications where it is necessary to vary the speeds of rotation of a plurality of driven members whilst maintaining constant the ratios of the speeds of rotation of the members to one another.

The linkage between the main control members and the control members of the pumps could be of a form other than the lever mechanism described. For example a cam mechanism might be used, which could be particularly useful with pumps having a non-linear relationship between the rate of delivery and the displacement of the control member, or with pumps in which the rate of delivery is controlled through a servo-system where the relationship might be linear or non-linear.

I claim:

1. A drive mechanism for driving a plurality of independently rotatable members, comprising a plurality of groups of fluid motors with each group including at least one fluid motor, each fluid motor adapted to be connected to a respective one of the rotatable members, a plurality of variable delivery pumps each connected to a separate group of the fluid motors to supply fluid thereto, each of said pumps having a separate control element for varying the rate of delivery of fluid from the respective pump, a prime mover arranged to drive the pumps, and control means operatively connected to the control elements of the pumps so as to vary simultaneously the rates of delivery of fluid from the pumps thereby to vary the speed of rotation of the respective groups of motors while maintaining constant at a pre-set value the ratio of the rates of delivery of respective pumps.

2. A drive mechanism as claimed in claim 1, in which the control means is adjustable to vary the pre-set value of the ratio of rates of delivery of any selected pair of the pumps.

3. A drive mechanism as claimed in claim 1, in which the prime mover is adapted to drive the pumps at constant speed.

4. A drive mechanism as claimed in claim 1, in which at least one of the pumps is arranged to supply fluid to a group of motors connected in series or in parallel to the pump.

5. A drive mechanism as claimed in claim 1 in which the control element of each of the variable delivery pumps has a displacement of which from a neutral position varies the rate of delivery of fluid in dependence on the degree of displacement, and the control means comprises a main control member and a mechanical linkage between the main control member and the control member of each pump adapted to effect a displacement of the control element of each group in dependence on the displacement from a neutral position of the main control member.

6. A drive mechanism as claimed in claim 5, in which each pump control element is a rotatable control shaft, the rate of delivery of each pump being proportional to the angular displacement of its control shaft from a neutral position, the main control member is a rotatable shaft, the main control shaft and pump control shafts being rotatable about parallel axes, and the mechanical linkage comprises a lever fixed to each pump control shaft and connected to a corresponding one of a plurality of levers fixed to the main control shaft by means of a rigid link pivotally connected at opposite ends to the two levers.

7. A drive mechanism as claimed in claim 6, in which the point of pivotal connection of each rigid link to one of the two corresponding levers is variable thereby to vary the effective radius of action of the lever.

8. A drive mechanism as claimed in claim 1, in which the prime mover is an internal combustion engine.

9. A lawn mower having a ground-engaging traction member and a rotatable cutting cylinder and a drive mechanism comprising a prime mover, a first fluid motor drivingly connected to the traction member, a second fluid motor drivingly connected to the cutting cylinder, first and second variable-delivery pumps driven by the prime mover and arranged to supply hydraulic fluid to the first and second motors respectively, each of said pumps having a separate control element for varying the rate of delivery of fluid from the respective pump, and control means operatively connected to the control elements of the pumps so as to vary simultaneously the rate of delivery of each pump while maintaining constant the ratio of the rates of fluid supply to the first and second motors thereby to keep constant the ratio of speeds of rotation of the cutter and traction member.

10. A lawn mower as claimed in claim 9, and including a plurality of cutting cylinders each provided with a fluid motor, the fluid motors being connected in series to the second pump.

11. A lawn mower as claimed in claim 9, in which there are provided valve means operable to divert the flow of fluid supplied by the second pump from the second motor to the first motor, to give an increased traction speed for transport of the lawn mower between cutting operations.

12. A lawn mower as claimed in claim 9, in which the control means includes two pedals positioned so that they can be simultaneously engaged respectively by the right and left foot of the driver of the mower, the pedals being interconnected so that movement of either pedal in one direction under pressure of the driver's foot causes the other pedal to move in the opposite direction, and the pedals being arranged in the control means so that movement of one pedal under pressure of the driver's foot effects an increase in the rate of delivery of the pumps, whilst movement of the other pedal under pressure of the driver's foot effects a decrease in the rate of delivery of the pumps.

13. A lawn mower as claimed in claim 12, in which the arrangement is such that in a neutral position of the pedals the rate of delivery of the pumps is zero, and movement of one pedal, under pressure of the driver's foot, beyond its neutral position causes the pumps to supply fluid to the motors to drive the lawn mower forwards, whilst movement of the other pedal, under pressure of the driver's foot, beyond its neutral position, causes the flow of fluid from the pumps to be reversed.

14. A lawn-mower as claimed in claim 13, in which there is provided a selector device which can be set by the driver to one of four positions, in a first of which the pedals are free to move over their full range of movement, in a second of which one of the pedals is prevented from being moved beyond its neutral position, in a third of which the other pedal is prevented from being moved beyond its neutral position, and in a fourth of which the pedals are held in their neutral position.

15. A lawn mower as claimed in claim 9, in which the prime mover is an internal combustion engine.

* * * * *